United States Patent Office 3,346,628
Patented Oct. 10, 1967

---

3,346,628
N-SUBSTITUTED AMINO-ALKANE
SULPHONIC ACIDS
Gerrit Riezebos, Ashford, Kent, England, and David
Adriaan van Dorp and Othmar Friedrich Schweigl,
Vlaardingen, Netherlands, assignors to Lever Brothers
Company, New York, N.Y., a corporation of Maine
No Drawing. Filed Mar. 10, 1964, Ser. No. 350,656
Claims priority, application Great Britain, June 7, 1963,
22,911/63
2 Claims. (Cl. 260—501)

The invention relates to novel substituted sulphonic acids, to a new method of preparing them and to the use of their salts in detergent compositions.

The substituted sulphonic acids according to the invention are those of formula

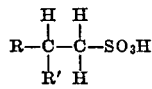

wherein R is a straight chain alkyl group having 4–16 carbon atoms, and R' is —$NH_2$, —$NHR_2$,

—$NHCH_2CH_2OH$

—$NHCH_2CH_2NH_2$, —$NR_2R_3$ or —O—$R_4$, wherein $R_2$, $R_3$ and $R_4$ are lower alkyl, having 1–4 carbon atoms.

In that such amino compounds as are designated by the above formula are known to exist in the betaine form, the present invention is also concerned with a substituted sulphonic acid having the formula

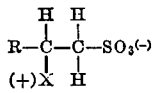

wherein R is as above defined and X is —$NH_3$, —$NH_2R_2$, —$NHR_2R_3$, or —$NR_2R_3R_5$, wherein $R_2$, $R_3$ and $R_5$ are lower alkyl.

These substituted sulphonic acids may be made by reaction of a beta-sultone with an agent which has an active hydrogen atom, for example, ammonia, amines or alcohols.

A beta sultone can be prepared by direct reaction of an olefin, preferably a straight chain alpha olefin having more than 6 carbon atoms, especially from 6–14 carbon atoms, with a sulphur trioxide/dioxane complex. This complex can be made by reaction between sulphur trioxide and dioxane in the gas phase. Preferably, gaseous dioxane and sulphur trioxide are introduced into an evacuated chamber whereupon the complex "snows out."

Complexes with a molecular ratio of $SO_3$:dioxane of 2:1 tend to give higher yields when considered from the point of view of direct isolation of the prepared compounds as compared with a molecular ratio of 1:1. In other words, the yield of the "first crop" is higher for the 2:1 than for the 1:1 complex. However, after working up the mother liquid this difference disappears.

Whilst the complex can be made in presence of a solvent, for example dichloroethane, it is advantageous to avoid solvent use so as to avoid working with large volumes and the recovery and purification of solvent. It is advantageous in the preparation of the beta sultone to recover the dioxane which is liberated as the sulphonation proceeds and to reuse it in the preparation of further sulphur trioxide/dioxane complex.

Other sulphur trioxide complexes having a similar sulphonating action may be used, for example sulphur trioxide/thioxane complex.

Novel alkene sulphonic acids of formula $$R—CH=CH.CH_2SO_3H$$

wherein R is an alkyl group having 3–15 carbon atoms, can be made by heating a beta-sultone. Discolouration of the reaction mixture can be prevented by use of excess dioxane, for example 1.5 moles dioxane per molesultone.

The substituted sulphonic acids are useful, after neutralisation, in detergent compositions, and the invention is concerned with such compositions.

The reactions of the beta sultones to give the substituted sulphonic acids according to the invention may be typified by the following reaction drawings.

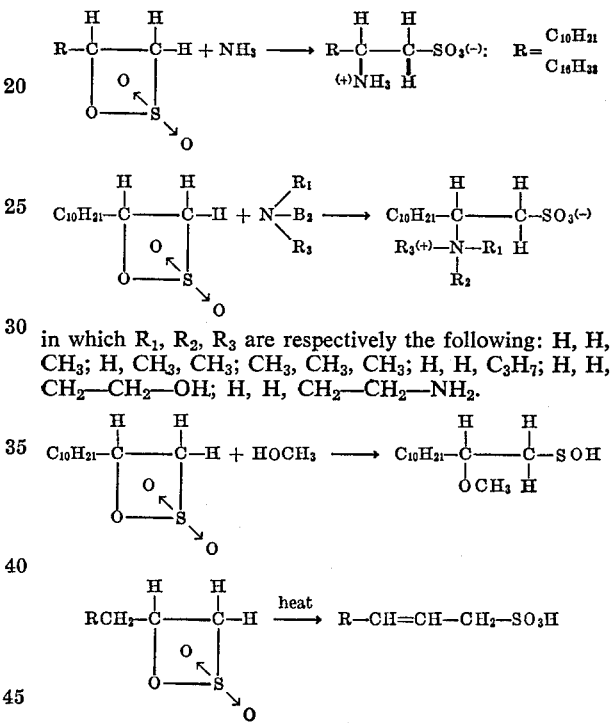

in which $R_1$, $R_2$, $R_3$ are respectively the following: H, H, $CH_3$; H, $CH_3$, $CH_3$; $CH_3$, $CH_3$, $CH_3$; H, H, $C_3H_7$; H, H, $CH_2—CH_2—OH$; H, H, $CH_2—CH_2—NH_2$.

$R=C_9H_{19}$, $C_{11}H_{23}$ or $C_{13}H_{27}$.

Preparation of a beta-sultone from an olefin and a $SO_3$/dioxane complex, using a solvent, is typified by the following experimental method.

EXAMPLE 1

250 ml. 1,2-dichloroethane (dried over $P_2O_5$ and distilled), and 0.3 mole dioxane (freed from peroxides and distilled over sodium), were placed in a 1 litre three-necked flask, provided with a stirrer, a thermometer, a drying tube and a dropping funnel equipped with a gas-inlet tube. The mixture was cooled in an ice/salt bath to $-10°$ C. 0.6 mole stabilised $SO_3$ was slowly added through the funnel with constant stirring, as a slow stream of nitrogen was passed through the reaction vessel, in order to prevent clogging in the stem of the dropping funnel. Stirring was continued for about 30 minutes, 0.6 mole alpha-olefin was then added to the dioxane/$SO_3$ complex as quickly as possible. The reaction mixture was constantly cooled to ensure that the temperature did not rise above 0° C., and stirred for 90 mins. at 0° C. after clearing.

Almost the same results were obtained when the reaction mixture was allowed to reach room temperature during the addition of olefin and stirring was continued for 30 minutes at 20° C.

Preparation of N-substituted sulphonic acids from a beta-sultone as prepared in Example 1 is illustrated by the following non-limiting examples.

EXAMPLE 2

(a) *General procedure*

A 1 litre three-necked flask provided with a condenser (filled with Dry Ice/acetone), a stirrer and a dropping funnel were placed into a cooling bath (Dry Ice/acetone). The dry base (such as $NH_3$ or the amine) in some excess with respect to the olefin was condensed or placed into the reaction flask. Using the dropping funnel, the ice-cold reaction mixture containing the beta-sultone was added to the liquid base, while cooling and stirring rapidly. After adding the sultone, the reaction mixture was stirred for 2 h. Subsequently the mixture was allowed to reach room temperature, and was slowly heated to 60° C. to remove the excess of the base.

(b) *Preparation of 2-aminododecane-1sulphonic acid (molecular weight 265.4)*

A beta-sultone prepared from dodecene-1 and ammonia were reacted in accordance with the general procedure 2(a). After evaporation of the ammonia the reaction mixture was cooled to room temperature and the crystals filtered off. The crude product was stirred with a 10% alcohol/water mixture (400 ml. per 100 g. of compound) and heated to 50° C. After cooling to 0° C. the crystals were filtered under vacuum and the treatment repeated with alcohol. The crystals were dried in vacuo over $CaCl_2$. A yield of 53% was obtained.

*Analysis.*—Total N (Kjeldahl): 5.25%; theoretically 5.28%. N (ammonia): 0.09%; theoretically 0.0%. Equivalent weight by titration: 267; theoretically 265.4.

(c) *Preparation of 2-aminooctadecene-1-sulphonic acid (molecular weight 349.6)*

A beta-sultone prepared from octadecene-1 by the method of Example 1 (modified by the use of 0.5 mole olefin and 300 ml. solvent), was reacted with ammonia. After completion of the reaction the $NH_3$ was removed and 500 ml. acetone were added. The crystals were isolated by filtration under vacuum. After drying the crystals, a yield of 60% was obtained.

*Analysis.* — N (Kjeldahl): 3.7–4.0%; theoretically 4.01%.

(d) *Preparation of aminosulphonic acids from a mixture of olefins*

A commercially available mixture of alpha-olefins (composition $C_{11}$, 13.5%; $C_{12}$, 25.5%; $C_{13}$, 25.5%; $C_{14}$, 25%; $C_{15}$, 10.5%) was converted by similar methods as in Example 1 and Example 2(a)–(c) into the aminosulphonic acids.

*Analysis.*—Total N (Kjeldahl): 5.03–5.07%; theoretically 5.07%.

(e) *Preparation of 2-methylamino-dodecane-1-sulphonic acid (molecular weight 279.4)*

A beta-sultone prepared from dodecene-1 by the method of Example 1 was reacted with excess methylamine in accordance with the general procedure. After evaporation of the excess methylamine, part of the 1,2-dichloroethane was distilled off. Subsequently the reaction mixture was transferred to a beaker and cooled to 0° C. The crystals were sucked off and washed with dichloroethane. After drying in vacuo the crude material was crystallized from alcohol (450 ml. per 100 g. acid). A yield of 46% was obtained. A second crop of pure material could be isolated from the mother liquor.

*Analysis.*—Total N (Kjeldahl): 5.06–5.07%; theoretically 5.01%. N (ammonia): 0.12–0.13%; theoretically 0.0%. Sulphur: 11.52%; theoretically 11.47%. Melting point: 249–250° C.

(f) *Preparation of 2-dimethylaminododecane-1-sulphonic acid (molecular weight 293.5)*

A beta-sultone prepared from dodecene-1 was reacted with dimethylamine. During the addition of the sultone stirring may become difficult, and dilution of the reaction mixture with an additional amount of 1,2-dichloroethane is recommended.

After evaporation of the excess dimethylamine the reaction mixture was cooled in ice/salt and the crystals filtered off under vacuum. The crude product was crystallized from ethanol. After evaporation of the combined mother liquors and crystallization from ethanol (or water), a second crop of pure material could be obtained. Total yield 57%.

*Analysis*: Total N (Kjeldahl): 4.71–4.73%; theoretically 4.77%. Ammonia: 0.06–0.07%; theoretically 0.0%. Sulphur: 10.4–10.7%; theoretically 10.92%.

(g) *Preparation of 2-trimethylaminododecane-1-sulphonic acid (molecular weight 307.5)*

The preparation was carried out in the same way as for 2-dimethylaminododecane-1-sulphonic acid, replacing trimethylamine for the secondary amine. Total yield 58%.

*Analysis.*—Total N (Kjeldahl): 4.52–4.53%; theoretically 4.56%.

(h) *Preparation of 2-propylaminododecane-1-sulphonic acid (molecular weight 307.5)*

A beta-sultone from dodecene-1 was reacted with propylamine and the mixture was refluxed for 2 h. No crystalline material separated out. The dichloroethane was distilled off and the residue stirred with ether (800 ml. for every 100 g. of material). The aminosulphonic acid became crystalline and was filtered off under vacuum and dried. The crude material was washed in a beaker with boiling water. After cooling the product was sucked off and dried. Yield: 44%.

*Analysis.*—Total N (Kjeldahl): 4.45–4.53%; theoretically 4.56%. Equivalent weight by titration: 306; theoretically 307.5. Melting point: 217–219° C.

(i) *Preparation of 2-ethanolaminododecane-1-sulphonic acid (molecular weight 309.5)*

To a solution of 1 mole ethanolamine in 200 ml. dichloroethane, 1 mole sultone from dodecene-1 was added in a period of 30 minutes at a temperature of −10–0° C., while stirring vigorously. After completion of the addition the mixture was brought to room temperature in about 1 h. Subsequently about 70% of the solvent was distilled off under reduced pressure. The residue, an oily mass, was poured while stirring into 2 l. acetone at 0° C. The precipitate formed was sucked off and washed with acetone. The product was crystallized from water (100 g. product in 2 l. water). Yield: 48%.

*Analysis.*—Total N (Kjeldahl): 4.51–4.51%; theoretically 4.53%. N (ammonia): 0.01%; theoretically 0.0%. Equivalent weight by tritration: 308.0; theoretically 309.5. Sulphur: 10.3–10.5%; theoretically 10.36%. Melting point: 243–243.5° C. (discolouration).

(j) *Preparation of 2-(-N-2'-aminoethyl)-aminododecane-1-sulphonic acid (molecular weight 308.5)*

A beta-sultone was prepared using 0.63 mole dodecene-1. This sultone was reacted with an excess of 65% of pure ethylene-diamine (total 63 g.). The amine was diluted with 100 ml. dichloroethane. (The temperature of the amine-dichloroethane mixture should not rise over 0° C., as otherwise a violent reaction may occur.) After addition of the sultone (−10–0° C.) the reaction mixture was stirred for 2 h. at 0° C. Subsequently the mixture was poured, while stirring, into 2 l. of acetone. The product was filtered off under vacuum. After a second washing with acetone the product was sucked off again and dried in vacuo. Yield 38%. The product was purified by dissolving it in water (1 g. per 20 ml.) at a temperature of 60° C. After filtration a 10% solution of $H_2SO_4$ was added until a pH of 1 (ca. 0.5 mole $H_2SO_4$ per mole of compound) was reached. The precipitate was isolated and washed with water and then with acetone. After drying and weighing the product was again converted with the theoretical amount of sodium hydroxide, calculated on the basis of the dry salt, to the compound containing one free $NH_2$ group. The pH of a solution of this latter compound was about 8.

Preparation of the alkoxy substituted sulphonic acids, from a beta-sultone prepared as in Example 1, is illustrated by the following non-limiting example.

EXAMPLE 3

Solium-2-methoxydodecane-1-sulphonate
(molecular weight 302.4)

A beta-sultone (1 mole) prepared from dodecene-1 was gradually added to methanol (2.5 moles), while stirring. The temperature of the reaction mixture should not rise above 15° C. After stirring for 2–5 h. at this temperature the mixture was neutralized with a solution of 15% $CH_3ONa$ in methanol. The mixture was cooled in ice during this treatment. About 75% of the base was consumed immediately, the rest after refluxing the reaction mixture for 12 h. Subsequently the mixture was cooled to 30° C. and diluted with 1.5 l. acetone. After cooling to 0° C. the crystals were isolated in the usual way.

The mixture obtained consisted of 60% sodium 2-methoxydodecane-1-sulphonate (according to the methoxyl determination), 35% sodium alkenesulphonate (according to the bromate-bromide titration) and some sodium hydroxydodecanesulphonate and sodium sulphate.

The preparation of a beta-sultone from an olefin and a $SO_3$/dioxane complex without using a solvent is typified by the following non-limiting example.

EXAMPLE 4

One tube of a 2 l. three-necked reaction flask was connected via a 1 l. buffer flask with a 250 ml. flask provided with a thermometer and a dropping funnel which contained an amount of dioxane. Another tube of the reaction flask was connected—via a 250 ml. buffer flask—with a 250 ml. flask provided with a thermometer and a dropping funnel which contained an amount of sulphur trioxide. The buffer flasks are necessary in order to prevent condensation from the vapours in the reaction flask.

The flasks could be isolated from each other by taps. After the whole apparatus had been brought under vacuum, the reaction flask was filled via the buffer flask with the dioxane vapour at 20° C.

Subsequently, the contents of the buffer flask—filled with the vapour of stabilised sulphur trioxide at 20° C.— was introduced into the reaction flask and the $SO_3$/dioxane complex "snowed out."

After repeating the procedure continuously for two hours, the temperature in the reaction flask being kept between 20–30° C., the yield was 47 g.

After determination of the composition of the $SO_3$/dioxane complex, it was added to the alpha-olefin (50% excess with respect to sulphur trioxide) at 5° C. and stirred for 30 minutes at 20° C. The molecular ratio $SO_3$:dioxane in the prepared complex was 1:1 up to 1.3:1.

The preparation of N-substituted sulphonic acids from the beta-sultone, prepared as in Example 4, can be carried out in the manner described in Example 2(a), for example, the 2-methylaminododecane-1-sulphonic acid can be prepared as follows.

Using methylamine and a beta-sultone prepared from dodecene-1, the reaction mixture was stirred for 1 hour, then allowed to warm to room temperature. The excess methylamine was removed by slowly heating to 60° C. The pasty mass was stirred into alcohol (400 mls. per 100 g. acid), and cooled to 0° C., from which the crystals were obtained by filtering off and drying under vacuum. The yield was similar to that obtained from Example 2(e).

The beta-sultones are also useful for the preparation of compounds which have sequestering groups, for example, according to the reaction:

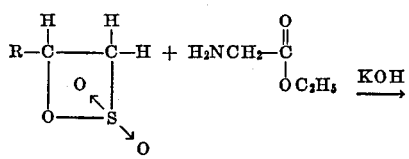

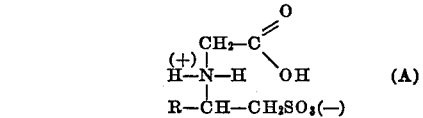

wherein R is a straight chain alkyl group having from 4–16 carbon atoms.

Compound (A) can also be prepared from the sodium salt of 2-aminododecane-1-sulphonic acid, by reaction of the sodium salt of monochloracetic acid therewith.

Similarly salts of other nitrogen substituted sulphonic acids can be so reacted so as to produce products having 2 or 3 —$CH_2$—COOH groups per molecule.

Preparation of a compound in class A from a beta-sultone (derived from dodecene-1 according to the method of Example 1), and glycine ethylester was carried out according to the following procedure.

EXAMPLE 5

An ice-cold solution of glycine ethylester (0.4 mole) in 100 ml. dichloroethane was added to 0.4 mole sultone over 20 minutes. The temperature was not allowed to rise above 0° C. A clear solution of pH 7.5 was obtained, which after refluxing for several hours was treated with 2 equivalents of a 10% sodium hydroxide solution and again refluxed for 6 h. Hot water was added to a total volume of 1 l. whereupon the dichloroethane layer was separated from the water layer. The water layer was acidified with concentrated hydrochloric acid to a pH of 1.

The following changes were noticed:

At a pH of 9–7 the solution was still clear,
At a pH of 4–3 the mixture became viscous,
At a pH of 2 the solution got a gel-like appearance,
At a pH of 1 a precipitate appeared, the viscosity decreased.

The mixture was stirred for 2 h. at 20° C. and stored overnight at about 10° C. The precipitate was sucked off, washed with water until free from acid and subsequently washed with acetone and dried under vacuo at 60° C. Yield 22%.

Analysis.—Equivalent weight determined by potentiometric titration: 336; theoretically 323.5. Nitrogen: 4.3–4.4%; theoretically 4.33%. Sulphur: 9.63–9.77%; theoretically 9.89%.

EXAMPLE 6

The alternative method employing the reaction of sodium aminododecanesulphonate and monochloroacetic acid was carried out as follows: The sulphonate was made according to Example 2(b). The reaction used a molecular ratio sodium aminododecanesulphonate:

$$NaOH:ClCH_2\text{—}COONa$$

of 1:2:4.0.125 mole of sodium aminododecanesulphonate was heated with 0.5 mole of the sodium salt of monochloroacetic acid in 1 l. of a 1% NaOH solution during 18 h. at 70° C. The mixture was cooled to 25° C. (unconverted aminosulphonate then begins to crystallize) and acidified with concentrated hydrochloric acid to a pH of 7–7.5. After sucking off, washing and drying, 28% of unconverted aminosulphonic acid was recovered. The filtrate was further acidified (pH=1). After boiling for 1 h. the mixture was cooled to 10° C. The crystals were sucked off, washed until free from acid and subsequently washed with acetone. Yield 70%.

*Analysis.*—Equivalent weight by potentiometric titration: 321; theoretically 323.5. Nitrogen: 40–15%; theoretically 4.33%. Sulphur: 9.6–9.8%; theoretically 9.89%.

The sodium salts of the substituted sulphonic acids are useful in detergent compositions.

The washing properties, the lathering behaviour, the sensitivity to calcium and magnesium ions and the water solubility of several substituted sulphonic acids were investigated.

The washing properties were carried out in Launderometer-12, using standard soiled test pieces AS 8 No. 323 at a cloth/liquor ratio 1:20 under the following conditions.

(i) 10 mins. to 60° C. and 15 mins. at 60° C.
(ii) 15 mins. to 95° C. and 5 mins. at 95° C.

The solutions used had compositions—

| Active Detergent, g./l. | Base powder,* g./l. | Sod. Perborate, g./l. |
|---|---|---|
| 0.5 | | |
| 1.0 | | |
| 0.5 | 1.5 | 0.25 |
| 1.0 | 3.00 | 0.50 |

Base Powder:*                 Percent by wt.
   Lather booster _____ 4.97
   Sod. tripolyphosphate _____ 49.69
   Sod. silicate (anhyd) _____ 14.42
   Sod. sulphate _____ 27.90
   CMC _____ 1.66
   Perfume _____ 0.22
   Anti-corrosion agent _____ 1.00
   Fluorescer _____ 0.14

The washing efficiencies (after 3 washings) were derived from reflectance measurements on the test pieces with the Elrephophotometer using 2 Osram incandescent lamps No. 8024 and a blue filter R46. The results showed that at 0.5 or 1.0% levels (active detergent only) under (i) or (ii) the following salts of sulphonic acids were superior to sodium tetrapropylene benzene sulphonate.

(a) Sodium 2-aminododecane 1-sulphonate
(b) Sodium 2-propylaminododecane 1-sulphonate
(c) Sodium 2-methoxydodecane 1-sulphonate
(d) Sodium 2-tetradecene-1-sulphonate
(e) Sodium 2-methylamino-1-sulphonate and the following salts were approximately equivalent:

(f) Sodium 2-aminooctadecane-1-sulphonate
(g) Sodium 2-aminohexane-1-sulphonate
(h) Mixture of sodium 2-aminoalkane-1-sulphonates derived from olefin mixture 25% $C_{10}$, 50% $C_{12}$, 25% $C_{14}$
(i) Mixture derived from olefins 13.5% $C_{11}$, 25% $C_{14}$, 25.5% $C_{12}$, 10.5% $C_{15}$, 25.5% $C_{13}$
(j) Sodium 2-dimethylaminododecane-1-sulphonate
(k) Sodium dodecene-1-sulphonate
(l) Sodium hexadecene-1-sulphonate In the completely built detergent compositions (a), (f), (h), (d), (k) and (i) were shown to be approximately equivalent in washing efficiencies.

The lathering behaviour was measured in the Schlachter-Dierkes apparatus at 45° C. using 2, 4 and 6 g. built detergent/litre water at 15° D.H. In a clean system, the compounds above designated (a), (h), (i), (k), (d), (l), (e), (b), and sodium 2-aminoethyl, aminododecane 1-sulphonate were shown to be at least equivalent to sodium tetrapropylene benzene sulphonate. In a system loaded with 1 g. tallow/litre, (h) was superior to sodium tetrapropylene benzene sulphonate. Those compounds of low lathering properties are useful in low sudsing formulations by virtue of their good washing properties. All the mentioned compounds are satisfactory in respect to their sensitivity to calcium ions, and markedly superior to sodium tetrapropylene benzene sulphonate. All but (a), (h) and (i) were satisfactory to magnesium ions.

In solubility tests, consisting of the gravimetric determination of the amount of surface active agent present in saturated solutions at 20±1° C., only (f) and (l) proved difficult to dissolve. The other compounds are comparable or superior than sodium tetrapropylene benzene sulphonate.

What is claimed is:

1. A substituted sulphonic acid sequestering agent having the formula

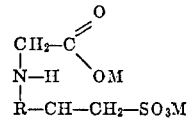

wherein R is a straight chain alkyl radical having from 4 to 16 carbon atoms and M is selected from the group consisting of hydrogen and sodium atoms.

2. A substituted sulphonic acid sequestering agent having the formula

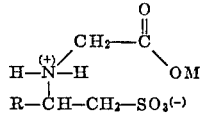

wherein R is a straight chain alkyl radical having from 4 to 16 carbon atoms and M is selected from the group consisting of hydrogen and sodium atoms.

References Cited

UNITED STATES PATENTS

| | | | |
|---|---|---|---|
| 2,107,197 | 2/1938 | Butignot | 260—513 |
| 2,120,512 | 6/1938 | Rosenhauer | 260—513 |
| 2,240,920 | 5/1941 | Werntz | 260—513 |
| 2,243,331 | 5/1941 | De Simo et al. | 260—513 |
| 3,200,127 | 8/1965 | Klass | 260—501 |
| 3,225,074 | 12/1965 | Cowen et al. | 260—501 |
| 3,235,539 | 2/1966 | Broussalian | 260—513 |
| 3,239,560 | 3/1966 | Cambre et al. | 260—501 |
| 3,255,239 | 6/1966 | Gardenier | 260—501 |

FOREIGN PATENTS 15,162    9/1913    Great Britain.

OTHER REFERENCES

Bordwell et al.: J. Am. Chem. Soc., 76 (Aug. 5, 1954), 3952–3956.

Bordwell et al.: J. Am. Chem. Soc., vol. 81, No. 2 (Apr. 20, 1959), 1995–2000.

Helferich et al.: Ann. 651, 33–48, C.A., relied on vol. 57, column 8475.

RICHARD K. JACKSON, *Primary Examiner.*

LORRAINE A. WEINBERGER, *Examiner.*

M. WEBSTER, *Assistant Examiner.*